United States Patent [19] [11] Patent Number: 5,153,808
Juntunen et al. [45] Date of Patent: Oct. 6, 1992

[54] PROCEDURE AND APPARATUS FOR PROTECTION OF A DATA TRANSMISSION NETWORK

[75] Inventors: Asko Juntunen; Heikki Leppanen; Kimmo Selin, all of Hyvinkaa, Finland

[73] Assignee: Kone Elevator GmbH, Baar, Switzerland

[21] Appl. No.: 518,069

[22] Filed: May 2, 1990

[30] Foreign Application Priority Data

May 2, 1989 [FI] Finland ................ FI892097

[51] Int. Cl.$^5$ ............ H02H 3/26; G08C 25/00
[52] U.S. Cl. ................ 361/91; 340/825.16; 361/42; 364/482; 364/483
[58] Field of Search ........... 361/42, 45, 49, 86, 361/90, 91, 82; 324/523, 525, 526; 379/2, 6, 24, 412; 371/20.6, 20.1; 375/10; 340/825.16

[56] References Cited

U.S. PATENT DOCUMENTS

| | | | |
|---|---|---|---|
| 3,947,759 | 3/1976 | Briggs | 361/42 |
| 4,197,435 | 4/1980 | Jackson et al. | 379/2 |
| 4,206,398 | 6/1980 | Janning | 324/527 |
| 4,298,969 | 11/1981 | Rickenbacker | 324/523 |
| 4,352,137 | 9/1982 | Johns | 361/82 |
| 4,410,925 | 10/1983 | Tucker et al. | 361/42 |
| 4,562,401 | 12/1985 | Ziegler | 324/525 |
| 4,636,909 | 1/1987 | Brandt | 364/483 |
| 4,656,471 | 4/1987 | Hanss et al. | 340/825.16 |
| 4,707,760 | 11/1987 | Allos | 361/90 |
| 4,796,147 | 1/1989 | Anderson et al. | 361/86 |
| 4,949,211 | 8/1990 | Edwards | 361/42 |

FOREIGN PATENT DOCUMENTS

0144496 5/1984 European Pat. Off. .
294303 12/1988 European Pat. Off. ......... 379/412

Primary Examiner—Geoffrey S. Evans
Attorney, Agent, or Firm—Nixon & Vanderhye

[57] ABSTRACT

The protected network consists of a signal bus provided with terminal impedances and connected via impedances to the supply voltage (+VIN) and signal ground (GND), and signal devices which are connected to the bus. To protect the network, the voltages on the bus are monitored, and the bus impedance is measured by means of a test pulse. If either the measured voltages, impedance, or both are outside an allowed range, at least the supply voltage (+VIN) of the signal devices is disconnected.

12 Claims, 9 Drawing Sheets

PROCEDURE AND APPARATUS FOR PROTECTION OF A DATA TRANSMISSION NETWORK

BACKGROUND OF THE INVENTION

1. Field of the Invention

The present invention relates to a method and an apparatus for the protection of a data transmission network consisting of a signal bus provided with terminal impedances and of signal devices connected to the bus.

A data transmission network implemented using pulse transformers and balanced with terminal resistors is liable to connection errors. A faulty connection may inhibit the whole bus. Moreover, since the devices using the bus are connected to it in parallel, an incorrect voltage supplied into the bus at any point may destroy all the devices connected to it. This involves maintenance problems and increases the costs. Further difficulties are encountered if the state of the bus is not known before a data transfer operation attempt.

SUMMARY OF THE INVENTION

The object of the present invention is to eliminate the above mentioned drawbacks. In order to protect the network, the voltages on the bus are monitored, the bus impedance is measured by means of a test pulse and the supply voltage at least to the signal devices is disconnected if either of the voltage, the impedance or both are outside an allowed range.

A single protection unit as provided by the invention may be employed to protect the network. This means that the costs involved are low. Moreover, the protection unit of the invention can be easily installed and maintained.

Accordingly, a method for electronic protection of a data transmission network said network comprising a signal bus with terminal impedances and at least one signal device, and said signal bus being connected to a DC power supply via impedances, wherein the voltage on the said bus is monitored and the said bus impedance is measured by means of a test pulse and wherein the DC power supply at least to the signal devices is disconnected if either the measured voltage or line impedance or both are outside an acceptable range is disclosed. According to this method the mains voltage supplying an elevator system is disconnected if either of the mains voltage phases is accidentally connected to the said bus. Furthermore, the present invention discloses an apparatus implementing the above mentioned method for the electronic protection of a data transmission network, said network comprising a signal bus with terminal impedances and at least one signal device, wherein said apparatus comprises impedances connecting the bus to the DC supply voltage; a mains voltage monitoring unit, a DC supply voltage and ground monitoring unit for monitoring the voltage on the said bus; an impedance testing logic for measuring the bus impedance by means of a test pulse; and a power switch controlled by a power switch control logic which disconnect the DC power supply at least to the signal devices if either the measured voltage or line impedance or both are outside an acceptable range. A mains control unit disconnects the mains voltage in the case of an erroneous connection of either of the mains phases to the said bus.

BRIEF DESCRIPTION OF THE DRAWINGS

In the following, the invention will be described in detail with reference to the accompanying drawings, in which:

FIG. 12a-12l show the pulse patterns in the line impedance testing logic.

DESCRIPTION OF THE PREFERRED EMBODIMENTS

Figure 1:
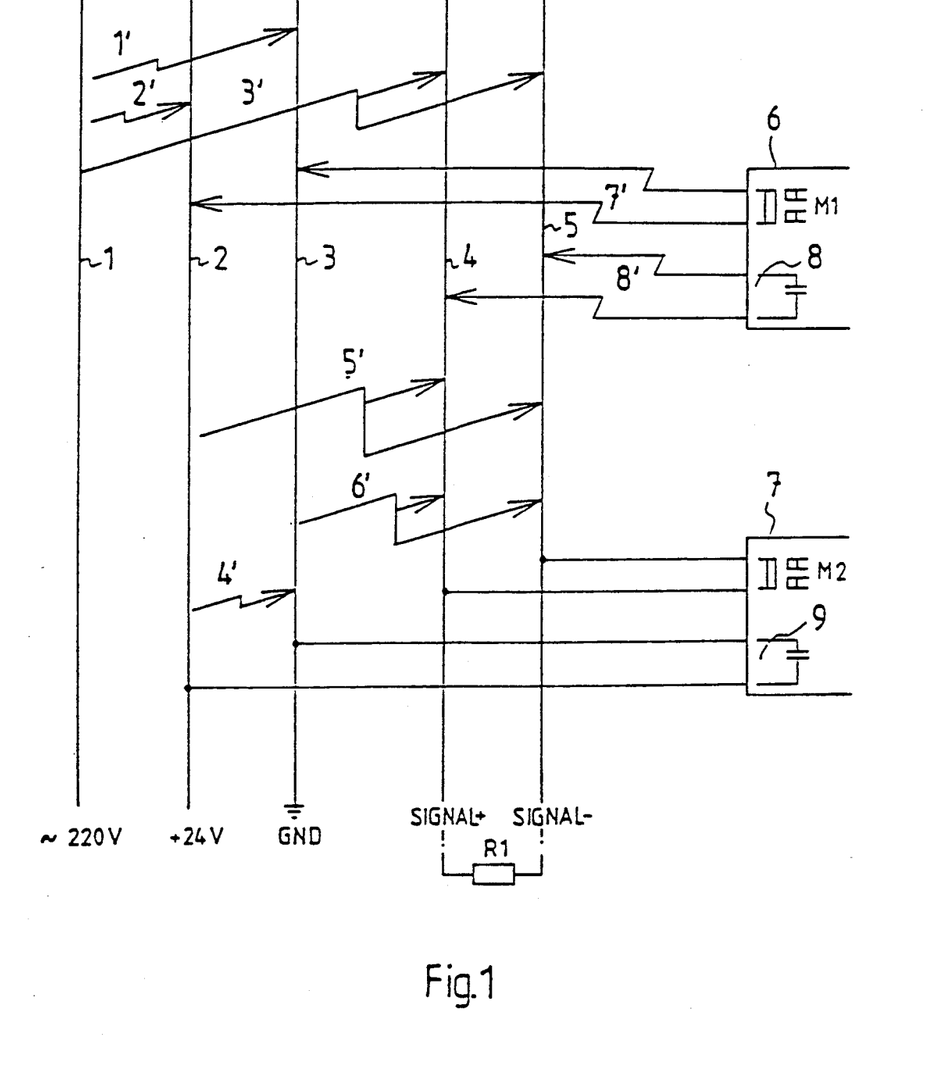
FIG. 1 illustrates the possible connection errors occurring in an elevator shaft.

As illustrated by FIG. 1, a data transmission network implemented using pulse transformers (M1, M2) and balanced with terminal resistors is installed in an elevator shaft. The following faulty connections (represented by arrows) and numbered consistent with the following paragraphs may occur:

1'. Direct connection between mains voltage, e.g. 220 V phase on conductor 1 and signal ground (GND), (i.e the neutral phase) in conductor 3. In this situation, the fuse blows, and no damage is produced to the network.

2'. Direct connection between mains voltage on conductor 1 and the positive supply voltage, e.g. 24 V, in conductor 2. This direct positive voltage supplies the devices 6 and 7 connected to the bus. In this case the supply voltage will exceed the admissible values in either positive or negative directions, destroying the devices connected to the bus.

3'. Direct connection between mains voltage in conductor 1 and one of the signal phases in conductor 4 (SIGNAL+) or 5 (SIGNAL−). This will disable the bus and endanger the maintenance personnel. No damage to the network will result. If one of the signal phases is connected to signal ground, all pulse transformers M1 and M2 in the devices connected to the bus will be destroyed.

4'. Direct connection between the supply voltage and signal ground, i.e. a short-circuit condition. As a result, the fuse will be blown, the power supply unit may be destroyed or the conductors may melt.

5'. The supply voltage connected to one or both of the signal conductors 4 and 5. This will disable data transfer, and should one of the bus conductors be connected to signal ground, the pulse transformers M1 and M2 of all devices connected to the bus will be burnt.

6'. Signal ground connected to the bus, disabling the data transfer. As in the previous case, should the direct supply voltage be connected to one of the signal conductors, the pulse transformer M1 and M2 of all devices connected to the bus will be destroyed.

7'. Pulse transformer M1 of signal device 6 connected between supply voltage (in conductor 2) and signal ground (conductor 3). Since the pulse transformer has a low resistance, it will practically constitute a short circuit and will be destroyed due to overheating.

8'. Voltage input 8 or 9 (GND, supply voltage) of signal device 6 or 7 connected to the signal bus. This disables data transfer but causes no destruction.

To cope with the error situations described above, continuous monitoring, detection and indication of the bus state are necessary. In addition, in the case of connection errors or incorrect voltages on the bus a fairly quick response is needed to prevent the destructive effects.

Figure 2:
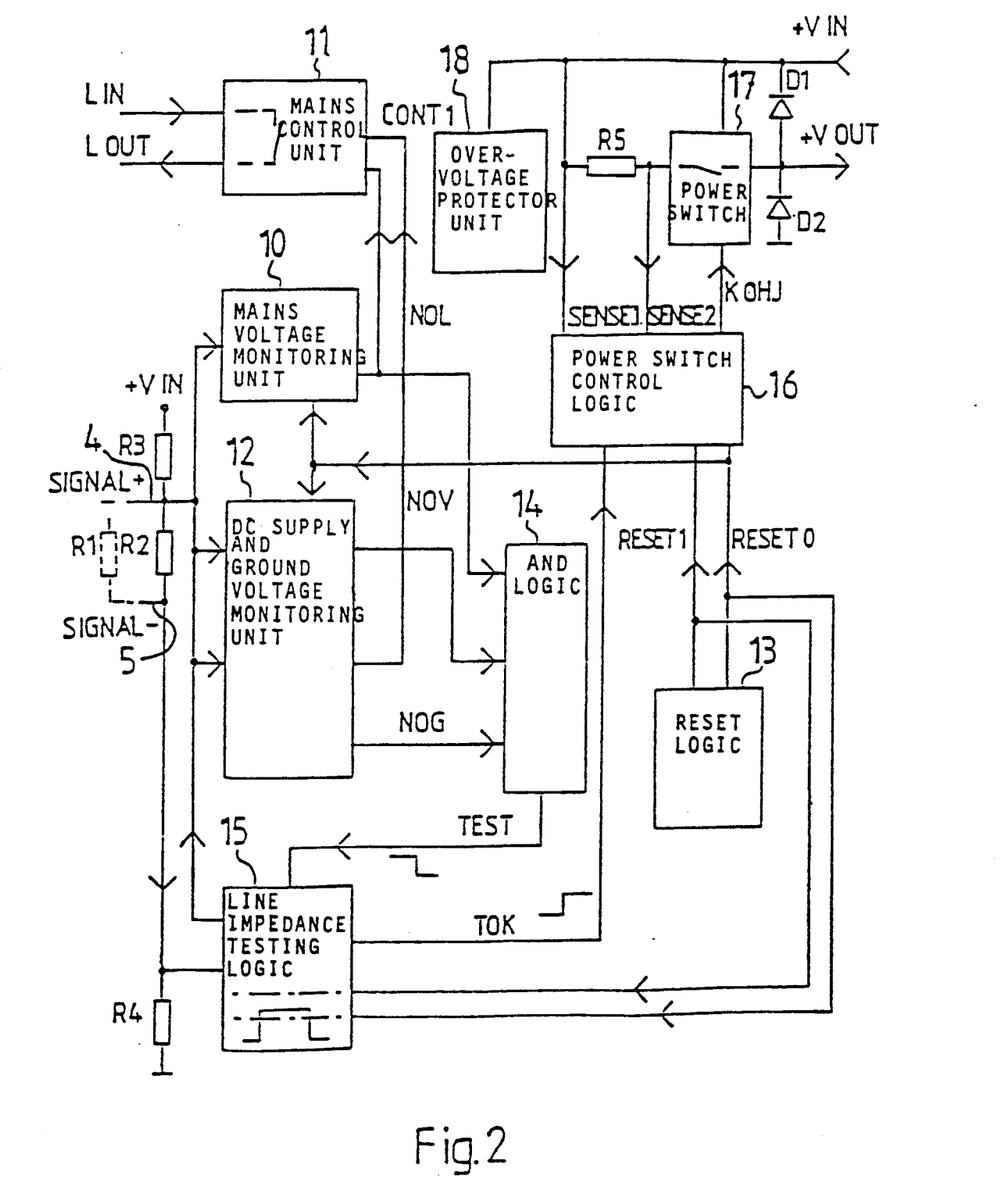
FIG. 2 shows a block diagram illustrating the detection and indication of error conditions and the protection circuits.

The solution proposed by this invention is shown on FIG. 2. Line 4 of the signal bus with terminal resistors R1 and R2 is connected via a resistor R3 to the positive supply voltage +VIN (e.g. +24 V) and the other line 5 is connected via another resistor R4 of equal value to signal ground. Data transmitted on the bus, consists of short pulses, both positive and negative, in the range of a few tens of volts. The bus is monitored via a delay circuit of a selected time constant, so that the bus voltage is half of the direct supply voltage. Information about the incorrect voltages on the bus is obtained by observing the average voltage on the bus.

Moreover, faulty connections causing malfunctions can be detected by measuring the line impedance.

The block diagram of FIG. 2 illustrates the principle of detection and indication of error conditions and the protective circuits.

The Mains voltage monitoring unit 10 monitors the signal bus for detecting a faulty mains voltage. If a mains value voltage is detected, the Monitoring unit 10 sends the Mains control unit 11 an instruction via the NOL signal. The Mains control unit 11 which is supplied by the mains voltage LIN, immediately switch off the mains supply LOUT to the elevator shaft. The presence of the mains voltage on the signal bus will disable the bus, without causing immediate damage. However, it is possible that meantime the other signal line be accidentally connected to the signal ground conductor. Should these two conditions occur simultaneously, the result would be the destruction of the pulse transformers of all signal devices connected to the bus. For this reason, the mains voltage must be switched off immediately when detected on the bus. Furthermore, the presence of the mains voltage on the bus requires that the supply voltage to the signal devices is as well switched off. The protection circuit indicates the presence of the error situation by turning on an LED, this LED will be turned off only after the error has been corrected and the voltage supply has been shut-off for a given period of time.

The D.C. Supply voltage and signal ground monitoring unit 12 monitors the signal bus for detecting an erroneous presence of the supply voltage and/or signal ground potential. If the supply voltage level is detected on the bus, it will be switched off immediately and an indicator light will be illumined to indicate the error. The supply voltage alone, will disable the bus although no damage results. This condition is not removed until the fault is eliminated and the power supply was off for some time. The supply voltage has to be switched off immediately because it is possible that the other signal conductor be connected to signal ground, in which case the pulse transformers of all devices connected to the bus would be destroyed.

If the signal ground potential is detected in the bus, the supply voltage and the mains supply are immediately switched off because in this case it is as well possible that one of these voltages be connected to the other bus conductor, which would result in the destruction of all devices connected to the bus. This condition is indicated by an illumined LED, which is turned off when the fault is removed.

The Mains voltage monitoring unit 10 and the Supply voltage and signal ground monitoring unit 12 operate continuously and react immediately upon detecting and incorrect voltage on the bus.

After the voltages have been connected to the devices, the Reset logic 13 performs an initial resetting (signals RESET0, RESET1) of the system and the AND logic checks the states of the Mains voltage monitoring unit 10 and the Signal ground monitoring unit 12 (signals NOL, NOF and NOG). If the bus voltages are correct, the Line impedance testing logic 15 is allowed (signal TEST) to carry out an impedance test on the signal bus. The line impedance test is implemented by sending a short pulse into the bus and observing it in certain locations along the bus. As shown above, the bus is provided with a terminal resistor R1, R2. The pulse transformer connecting each signal device to the bus is practically a short circuit for direct current, whereas for a short pulse it appears as a relatively high impedance. Therefore, if the return pulse remains within certain preset limits, i.e. if the bus impedance value is such that the bus operates normally (acknowledged by signal TOK) then, the Power switch control logic 16 is allowed to turn on the Power switch 17 (signal KOHJ).

If after a power failure the signals provided by the mains voltage monitoring unit 10 and the supply voltage and signal ground monitoring unit 12 indicate the presence of a fault, no impedance testing is performed and the Power switch 17 is not allowed to turn on the supply voltage.

The line impedance test may be carried out only after the voltage was switched on.

After a power failure, the Reset logic 13 performs initial resetting of the whole testing and protection logic.

The Overvoltage protector unit 18 monitors the voltage of both the power supply unit and the bus. If for example the voltage +VIN generated by the power supply unit increases above a limit (e.g. due to damage of the unit or to a connection error), the Overvoltage protector unit will short-circuit the supply voltage to ground, in which case the supply voltage fuse will blow out while the signal devices will remain undamaged. In the case of a connection error, when the mains voltage is connected to the +VOUT terminal, (2' in FIG. 1), the voltage on line 2 will start rising and, through diode D1, the increase will be detected by the Overvoltage protection unit 18, which will short-circuit the line to signal ground. In this case, both the supply voltage fuse and the mains voltage fuse will blow out, while the signal devices will remain intact. If the mains voltage is connected during the negative half-cycle, the current will flow through diode D2 and blow the fuse.

After the initial resetting, the Power switch control logic 16 awaits permission from the Line impedance testing logic 15 (signal TOK) to turn on the Power switch 17. If permission is received, the switch 17 is turned on for a short time producing a short current pulse. This pulse will charge the capacitances of the signal devices (8 and 9) to a value close to their final value. Towards the end of the pulse, a current consumption test is performed by checking the voltage across the current sensing resistor R5. If the measured current has a value below the permitted maximum value, the Power switch 17 is turned on and is continuously monitored by a control voltage. An indicator light is also lit to show that the supply voltage for the signal devices has been switched on. The current is monitored continuously, and should its value increase above the permitted maximum for longer than an established period of time, the control signal driving the Power switch 17 would be removed. The power switch will turn off and an indicator light will indicate the presence of an overload condition.

After a certain time, a new attempt to turn on the power switch is made. The switching unit is designed so that even if the output is directly and continuously short-circuited to signal ground, the unit will not be destroyed.

The Power switch control logic 16 is equipped with a dynamic current limit check. This means that if the current consumption during normal functioning changes too much and too fast, it is most probable that a short-circuit has occurred on the bus (e.g. due to connection error 7). In this case, it may be that a pulse transformer was directly connected between the supply voltage and signal ground. This situation may appear also when a signal device is connected to the data transmission network while the bus supply voltage is on.

The dynamic current limit is set to a sufficiently high value to permit a regular connection of a signal device while the supply voltage is on, in which case the dynamic current limit is not exceeded.

The undesired effects of the various erroneous connections illustrated by FIG. 1 are eliminated by the use of the apparatus of the present invention as follows:

1'. The fuse is blown electronic circuits are not damaged.

2'. The Overvoltage protector 18 is activated, causing the fuses to blow out while the electronic circuits remain undamaged.

3'. The Mains voltage monitoring unit 10 detects the presence of the mains voltage on the bus and acknowledges the control unit 11 to switch off the mains supply before any damage occurs. The supply voltage is also switched off as the Power switch 17 is turned off. Though nothing is damaged, the presence of the mains voltage stops the data traffic on the signal line. It must be avoided that the other signal line be connected to signal ground, in which case all the devices connected to the bus will be damaged.

4'. When the supply voltage is connected to signal ground, upon detecting the error as an overload, the Power switch control logic 16 turns off the power switch 17, thereby preventing damage of the electronic circuits.

5'. Connecting the supply voltage to the signal line activates the Supply voltage and signal ground monitoring unit 12, and consequently the control signal to the Power switch 17 is quickly removed. The presence of the supply voltage in the signal line will not cause damages in itself, but it is possible that the other signal conductor is connected to signal ground, in which case all the devices connected to the bus would be destroyed.

6'. The presence of the signal ground potential on the signal bus disables the data transfer but does not cause damage in itself. However, it is possible that either the mains voltage or the supply voltage is simultaneously connected to the other signal conductor. In order to avoid this situation, both the supply and the mains voltages are quickly switched off.

7'. The bus connections of a signal device may be accidentally connected to the power supply lines. Since the pulse transformer practically constitutes a short circuit for direct current, it would be destroyed. In order to avoid this situation, the Power switch control logic 16 detects the fault and quickly turns off the Power switch 17, thus preventing the destruction of the pulse transformer.

8'. The d.c. voltage supply terminals of a signal device may be accidentally connected to the signal bus. This disables the data transfer. The Supply voltage and signal ground monitoring unit 12 perceives the faulty connection as a change in the impedance and indicates that signal ground is connected to the signal line, whereupon the supply and mains voltages are quickly switched off.

In the following, the units shown in FIG. 2 will be described in detail.

Figure 3:
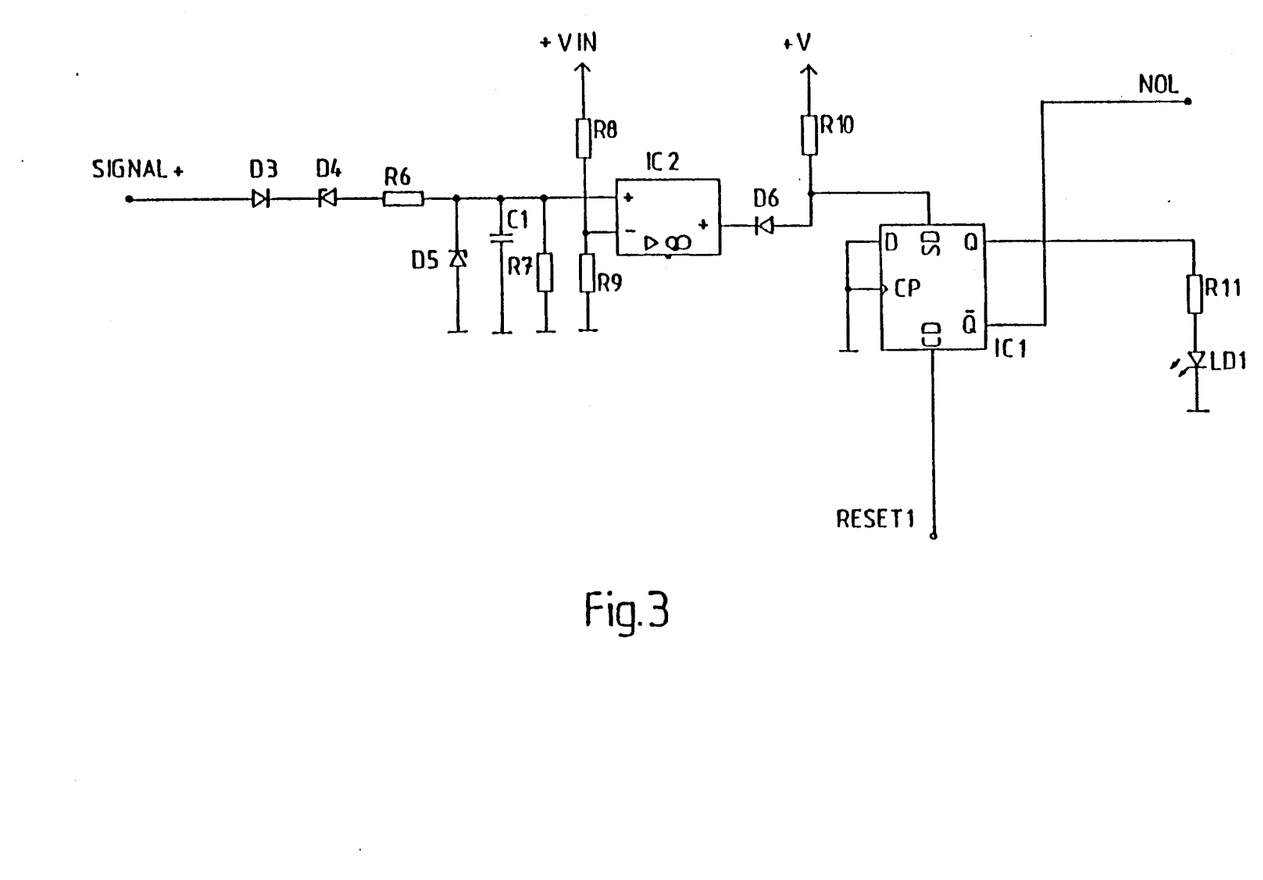
FIG. 3 represents the mains voltage monitoring circuit.

The Mains voltage monitoring unit 10 shown in FIG. 3 monitors the bus voltages and, upon detecting the presence of the mains voltage, indicates this by switching on an indicator light and by generating a signal NOL.

After a power failure, the RESET1 signal which is a positive pulse of voltage $+V$, (e.g. $+15$ V) resets the flip-flop IC1. The NOL output goes high to the level of the voltage $+V$, while the indicator light LD1 turns off.

When the mains voltage appears on the bus, capacitor C1 is quickly charged via diode D3, Zener diode D4 and resistor R6 to the positive voltage $+V$. The voltage across the capacitor is limited by Zener diode D5 to $+V$. When this voltage becomes greater than the level of the voltage divider made of resistors R8 and R9, the output of comparator IC2 goes high. This stops the flow of the current from the positive voltage $+V$ through resistor R10 and diode D6. As a result, the SD input of the flip-flop goes high and the flip-flop is set. Consequently, the NOL output falls to 0 V and a voltage is applied to resistor R11. The current flowing through indicator LD1, will activate the light emission. Simultaneously, the 0 V NOL signal switches off both the mains and the supply voltages.

Even if the mains voltage disappears from the bus, the NOL signal will not return to the positive level until the supply voltage is switched of and then on again, in order to reset flip-flop IC1 with the RESET1 signal.

Zener diode D4 defines the threshold voltage level above which the SIGNAL+voltage must rise for charging capacitor C1. When mains voltage is turned off the capacitor slowly discharges via resistor R7. Zener diode D5 limits the maximum voltage at the comparator IC2 input to a safety level ensuring that the comparator will not be destroyed.

Figure 4:
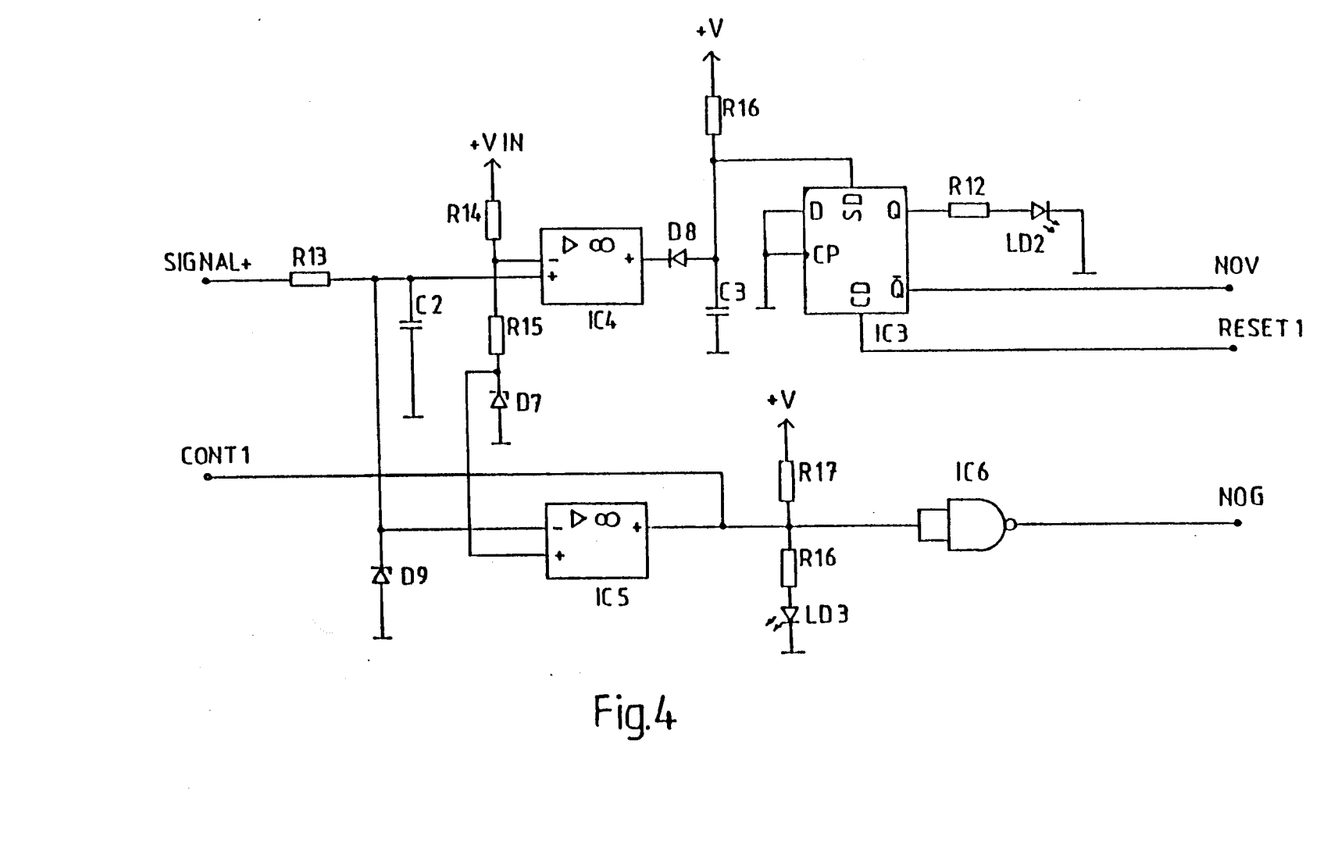
FIG. 4 represents the supply voltage and ground potential monitoring circuit.

The supply voltage and signal ground monitoring unit shown in FIG. 4 monitors the signal bus and visually acknowledges if either the supply voltage or the signal ground potential are detected on the bus. In FIG. 4, the upper section of the circuit monitors the bus for the supply voltage detection while the lower section monitors the signal ground detection.

After a power interruption, the Reset logic 13 resets flip-flop IC3 via the RESET1 signal. The flip-flop output NOV rises to the level of the positive voltage $+V$ while the voltage at the other output falls to O V. In this situation, no current flows through resistor R12 and indicator LD2, which therefore remains unlit.

In the case of a normal functioning of the signal bus, the positive signal line 4 (SIGNAL+) is at a positive voltage of about +12 V. Because of the filtering circuit consisting of resistor R13 and capacitor C2, this voltage is seen at the positive input "+" of comparator IC4 as a d.c. voltage level. The reference voltage, e.g. +17 V, applied to the negative input "−" of the comparator is obtained from the voltage divider made of resistors R14 and R15 and diode D7. When the supply voltage accidentally appears on the bus line 4, the signal voltage on the SIGNAL+ line increases accordingly and capacitor C2 charges via resistor R13 to this voltage level. When the voltage across capacitor C2 surpass the level of the reference voltage, the output of comparator IC4 goes high, so that the current will no longer flow through resistor R16 and diode D8. Consequently, the voltage at the SD terminal of flip-flop IC3 increases to the positive voltage +V level and the flip-flop is set. This means that output Q of the flip-flop turns to the positive voltage +V, a current starts flowing through resistor R12 and indicator LD2, which is thus lit. Simultaneously, the flip-flop output NOV falls from the positive voltage +V to O V, consequently turning of Power switch 17 thereby switching off the supply voltage to the signal devices.

In order to restore the functioning conditions of the signal bus, after SIGNAL+ has returned to its normal value and the power supply of the system has been off for some time, a RESET1 signal will reset the flip-flop IC3. Thus the indicator light LD2 will turn off and the NOV signal will reach the positive voltage level +V.

In the signal ground monitoring section, comparator IC5 sees the signal SIGNAL+ connected to the negative input of the comparator IC5 as a positive voltage, e.g. +12 V. While the positive input of comparator IC5 has a lower voltage, (e.g. 5.6 V) the comparator output is 0 V. Therefore, no current flows through resistor R16 and indicator LD3. The output NOG of NAND circuit IC6 is at the positive voltage level +V.

When signal ground is accidentally connected to the bus, SIGNAL+ falls to 0 V and the output of comparator IC5 increases to the positive voltage +V which is connected via resistor R17. A current will flow through resistor R16 and indicator LD3. As a result, indicator light LD3 is lit and the output signal NOG falls to 0 V. The power switch 17 is turned off by this signal and the power supply of the signal devices is interrupted.

When the output of the comparator IC3 becomes +V, the CONT1 signal increases as well to the positive voltage level +V, and the mains voltage control unit 11 switches off the mains voltage supply to the elevator shaft. As soon as the signal ground potential is removed from the bus, SIGNAL+ increases back to a positive voltage level +12 V, indicator light LD3 is extinguished, the CONT1 signal falls to O V and the NOG signal rises to the positive +V. Zener diode D9 protects the signal inputs of amplifiers IC4 and IC5.

Figure 5:
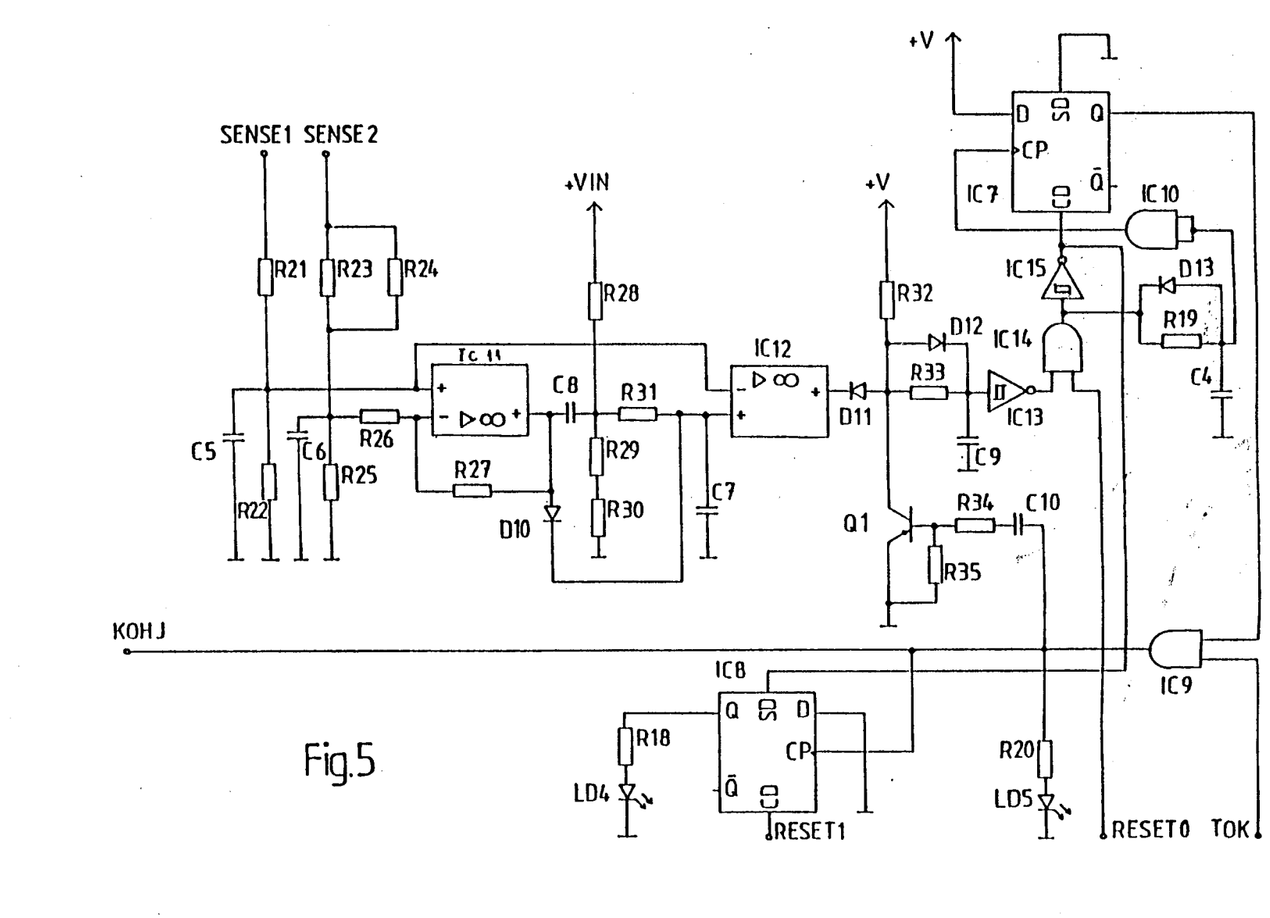
FIG. 5 represents the power switch control logic.

In the power switch control logic shown in FIG. 5, the +V pulse RESET1 and the 0-V pulse RESET0 reset flip-flop IC7 and set flip-flop IC8. As mentioned above, the signals RESET1 and RESET2 are generated by the reset logic 13 of FIG. 2 every time the supply voltage is switched on. The overload indicator LD4 connected to output Q of flip-flop IC8 via resistor R18 is unlit because the voltage of output is 0 V. The output of AND gate IC9 is 0 V because flip-flop IC7 has been reset and thus the indicator LD5 is as well unlit.

If no fault has been detected in the initial impedance tests, the TOK signal will have the +V voltage level. The output of gate IC14 is high and capacitor C4 starts charging via resistor R19 towards the level of +V, and when the capacitor voltage reaches the threshold value of the AND circuit IC10 connected to it, the output of IC10 will go high. Therefore, the voltage +V at the D input of flip-flop IC7 passes to its Q output. The AND gate IC9 will open and signal KOHJ now rises to +V voltage level, thus turning on the power switch 17 (FIG. 2).

Indicator LD5, which is connected via resistor R20 to the output of AND gate IC9, indicates the state of the power switch control signal.

Signals SENSE1 and SENSE2 monitors the voltage across, or more precise the current through, the current sensing resistor R5. SENSE1 line is connected to the positive input of amplifier IC11 via resistors R21 and R22 and capacitor C5, and SENSE2 line is connected to the negative input of amplifier IC11 via resistors R23-R26 and capacitor C6.

When the current through resistor R5 increases above the allowed limit, the voltage at the +-input of amplifier IC11 becomes more positive than the voltage at the—input, so that the amplifier output voltage will increase and capacitor C7 will charge via diode D10. Diode D10 is connected to IC11 output and to the +-input of amplifier IC12. As a result, the +-input of amplifier IC12 becomes more positive than its—input, which is connected to the +-input of amplifier IC11 and the output of amplifier IC12 will become high. Therefore the current will no longer flow through resistor R32 and diode D11 but it will instead flow through resistor R32, diode D12 and capacitor C9, charging it. If the overload condition lasts long enough for C9 to be charged above the threshold voltage of Schmitt trigger IC13, the trigger output will fall to 0 V. As a result, the output of AND circuit IC14 falls to 0 V, the output of inverter IC15 rises to +V and flip-flops IC7 is set and IC8 is set. Capacitor C4 discharges via diode IC13 while the output of AND circuit IC14 is low. The output of AND circuit IC10 follows the capacitor voltage. As flip-flop IC7 is reset, the KOHJ signal at the output of AND circuit IC9 falls to 0 V, thus turning off power switch 17.

Once the power switch has been turned off, the output of amplifier IC12 returns to 0 V and the current flowing through its load resistor R32 is passed to ground through diode D11. As well capacitor C9 discharges via resistor R33 and diode D11 to ground.

The time constant of the circuits formed of resistor R33 and capacitor C9 is selected as to maintain the output of AND circuit IC14 to O V long enough in order to allow capacitor C4 to discharge via diode D13. An appropriate (short) time constant of the circuit formed of resistor R32 and capacitor C9 prevents the turning off of the power switch 17 during a momentary overload condition.

In an overload situation, flip-flop IC8 is set and indicator LD4 is lit.

When the KOHJ signal is rising to the +V voltage, the rising edge of the signal is delayed by resistor R34 and capacitor C10 connected to the base of transistor Q1. During this time, transistor Q1 conducts and its collector voltage is 0, short circuiting the resistor R32 to the OV-level. In this way, the overload monitoring function is bypassed during the first instants after the power is switched-on. This arrangement allows the capacitors in the signal devices to be charged to the supply voltage before the monitoring of the average current consumption starts.

After the initial delay, transistor Q1 is shut off and monitoring operation is started. The emitter and base of the transistor are connected by resistor R35.

After an overload condition, a new attempt to switch on the power supply is made only after a delay determined by the time constant of the circuit formed of resistor R19 and capacitor C4.

The current monitoring system incorporates a dynamic current limit. After the power switch 17 has been turned on, the monitoring of the current consumption is started. If a sudden change of sufficient duration is detected in the current value, it is possible that a pulse transformer has been connected to the supply voltage at the end of a long signal line, in which case the condition is not interpreted by the apparatus as a direct short circuit. However, the pulse transformer would be destroyed in time due to overheating. An interruption in the voltage supply would tell the maintenance personnel that he has made an incorrect connection during operation of the network. However, the current limit is set high enough as to permit a correct connection of a signal device while the supply voltage is on.

The dynamic current limit is given by the circuit consisting of resistors R26, R27 and R31 and capacitors C8 and C7. If the current quickly increases this increase is amplified by IC11 at a rate dependent upon the quota between resistors R26 and R27. The amplified jump of voltage passes through capacitor C8 and generates a current through resistor R31 and capacitor C7. If the increase is substantial, capacitor C7 will be charged so that the voltage across it will be bigger than the level of the—input of amplifier IC12. As a result, the output of this amplifier goes to the +V voltage. Thus, the control voltage to the Power switch 17 goes low as described above and the switch turns off. If the increase in the current through resistor R5 is small, the voltage across capacitor C4 will not rise sufficiently and no tripping occurs. Capacitor C7 discharges via resistors R29 and R30 to ground until the voltage across it reaches the level determined by the voltage divider consisting of resistor R28, connected to the +V voltage, and resistors R29 and R30, connected to ground.

When the KOHJ signal increases again to the +V voltage, indicator LD5 is lit and indicator LD4 extinguished.

Figure 6:
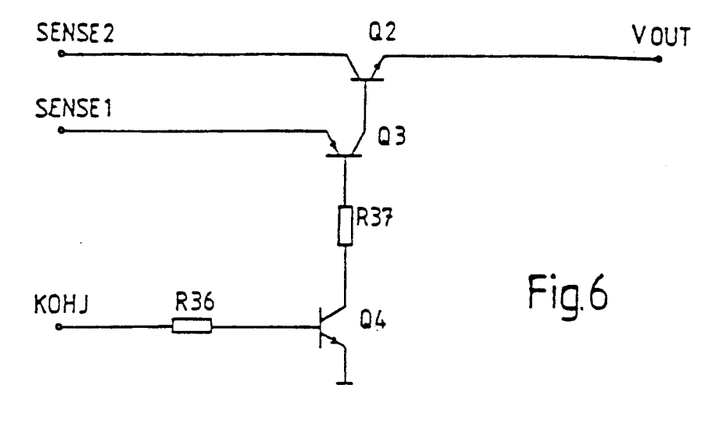
FIG. 6 represents the power switch.

The Power switch shown in FIG. 6 functions as follows. After the supply voltage has been connected, if no errors are detected by the monitoring system or during the bus impedance test, as explained above (FIG. 5) the power switch control signal KOHJ becomes +V. Transistor Q4 receives a base current via resistor R36 and is turned on. As transistor Q4 starts conducting, the current flows through resistor R37 to the base of transistor Q3, which turns on. The voltage SENSE1 will pass to the base of the power transistor Q2 turning it on. Thus the voltage +VIN (identical to voltage SENSE2) is passed to terminal +VOUT.

In an overload situation, the Power switch control logic 16 turns power switch control signal KOHJ to 0 V, whereupon transistor Q4 is turned off, thus turning off transistor Q3 and, consequently, transistor Q2. Thus, the connection between VIN and VOUT is interrupted.

Figure 7:
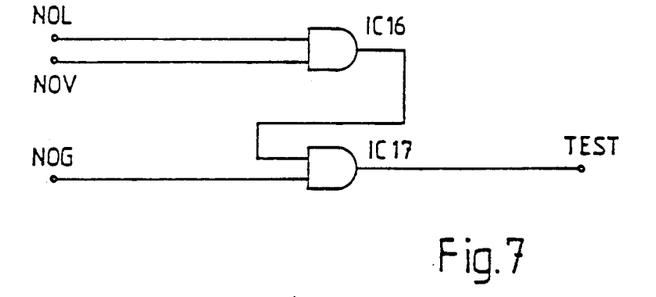
FIG. 7 represents the AND logic.

FIG. 7 represents the AND logic for the outputs of the units monitoring the bus state. If the signals NOL, NOV and NOG applied to the inputs of AND circuits IC16 and IC17 have the +V voltage level, the logic enables the bus impedance testing after a power interruption by outputting a TEST signal of +V volts. If during normal operation one of the input signals falls to 0 V, the signal TEST will also fall to 0 V, and the Power switch control logic 16 will turn off the power switch 17.

Figure 8:
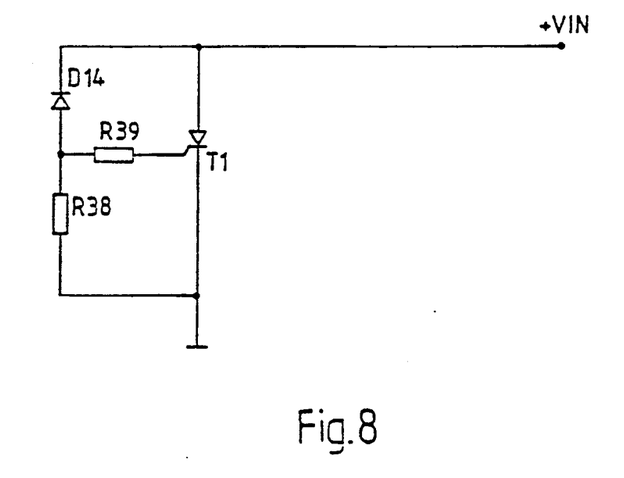
FIG. 8 represents the overvoltage protection circuit.

The Overvoltage protector circuit shown in FIG. 8 monitors the voltage +VIN generated by the voltage supply unit and the voltage +VOUT. If the voltage VIN increases too much, the voltage across resistor R38 will increase and a current will appear through resistor R39 to the gate of thyristor T1. The current flowing to the gate of thyristor T1 increases proportionally with the VIN signal. When the threshold gate voltage is reached the thyristor is fired, short-circuiting +VIN to ground. The resulting large current will blow out the fuse connected in the power supply line on the elevator control board, preventing the destruction of the bus electronic circuits. Should the mains voltage be accidentally connected to +VIN, the firing of the thyristor occurs as described above and the mains voltage fuse will blow-out as well.

Figure 9:
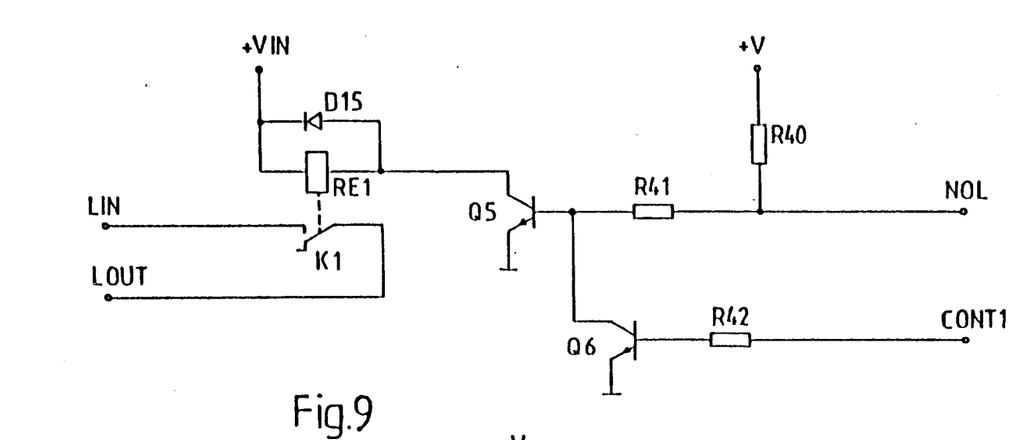
FIG. 9 represents the circuit controlling the mains voltage signal.

The Mains control unit 11 is shown in FIG. 9. When the bus functions, the NOL signal is kept at +V voltage level via resistor R40, while the CONT1 signal is at 0 V. Transistor Q6, whose base is connected to the CONT1 signal via resistor R42, is not conducting. Transistor Q5 receives a sufficient base current via resistor R41, and is turned on. Therefore, the voltage at the collector of transistor Q5 is approximately 0 V, and relay RE1, connected in parallel with diode D15, is in the energized state. Consequently, switch K1 connects the voltage LIN to the output LOUT.

When the mains voltage monitoring unit 10 detects the mains voltage in the signal bus, the NOL signal falls to 0 V, thus turning off transistor Q5. Relay RE1 releases the contact of switch K1 thus interrupting the supply of the voltage LIN to the output LOUT.

In case the Supply voltage and signal ground monitoring unit 12 detects the signal ground potential in the signal bus, the CONTI signal becomes +V. Transistor Q6 starts conducting, the base current of transistor Q5 falls and Q5 is turned off. Therefore, relay RE1 releases and the connection between the mains voltage LIN to LOUT is interrupted.

Figure 10:
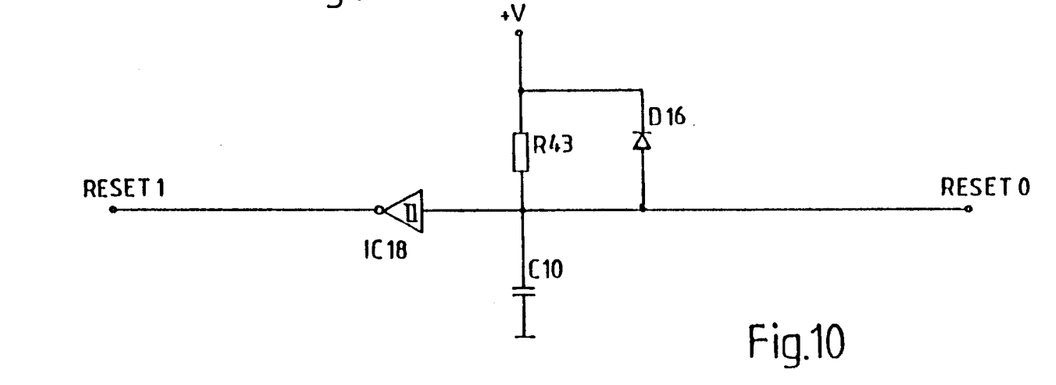
FIG. 10 represents the reset logic.

The reset logic in FIG. 10 performs the initial resetting of the system after a power interruption.

Since the system requires reset signals active both in the 0-state and in the 1-state, signal RESET0 is employed as the former and signal RESET1 as the latter.

When the system is connected to the power supply, at the first instant, when the voltage across capacitor C10 is 0 V, the RESET1 signal is at +V for a time determined by the time constant of circuit formed of resistor R43 and capacitor C10. Capacitor C10 charges via resistor R43 to the voltage +V. When the voltage across it reaches the threshold voltage value of the input of Schmitt trigger IC18, the RESET1 signal at the trigger output changes to approximately 0 V and remains in this state.

The line impedance testing logic shown in FIG. 11 functions as follows. After a power interruption the reset logic 13 (FIG. 2) performs initial resetting of the system by generating a RESET0 signal (0 V) and a RESET1 signal (+V) for approximately 1 s. Flip-flops IC19 and IC20 in the testing logic are reset and the outputs Q of both are 0 V. Indicator light LD6, connected via resistor R44 to the flip-flop output Q, is unlit. Transistor Q7 is not conducting, because no control current is flowing to its base through resistor R45.

If the voltages detected in the line by the Mains voltage monitoring unit 10 or the Supply voltage and signal ground monitoring unit 12 are correct, AND logic unit 14 will generate a TEST signal of +V. The TEST signal is connected to input D of flip-flop IC19. While the RESET1 signal is at the +V level, capacitor C11 is charged through resistor R46 and diode D17 to the voltage of +V. When the RESET1 signal returns to the 0 V level, capacitor C11 starts discharging via resistor R47. The +-input of comparator IC21 is kept at a constant voltage level by the voltage divider made of resistors R48 and R49. As soon as the capacitor voltage falls below the level of the voltage at the +-input of comparator IC21, the comparator output changes from 0 V to the +V level. As a result, diode D18 stops conducting and the clock input CP of flip-flop IC19, which is active on the rising edge of a pulse goes to the +V voltage via resistor R50. If the TEST signal is at the +V voltage, output Q of flip-flop IC19 goes to +V voltage level. Transistor Q7 receives a base current through resistor R45 and starts conducting. Therefore, relays RE2 and RE3 are energized, and activates contact K2 and K3. Contact K2 connects the positive signal line (SIGNAL+) to MOSFET Q8 and contact K3 connects the negative signal line (SIGNAL−) to signal ground. One terminal of each relay RE2 and RE3 is connected to the supply voltage +VIN, and a diode D19 is connected in parallel with the relays for protection.

When output Q of flip-flop IC19 has +V level, capacitor C12 charges via resistor R51. As soon as the input of Schmitt trigger IC22 has reached the threshold value, its output falls to 0 V. Therefore, the output of the Schmitt trigger IC23 connected after IC22 rises to the +V voltage one of NAND circuit IC24 inputs. Simultaneously, the capacitor C13 connected to the other input of NAND circuit IC24 is charged at a level of +V (it was formerly charged at the output level of IC22). Thus, the output of NAND circuit IC24 falls to 0 V, the output of NAND gate IC25 goes correspondingly to +V voltage turning MOSFET Q8 on. The voltage +VIN is now passed via resistor R53 and contact K2 of relay RE2 to the positive line SIGNAL+ of the bus. This line SIGNAL+ is connected to the terminal resistors and pulse transformers as shown in FIG. 1.

AND gate IC26 is connected to the output of NAND circuit IC24. The other input of this gate is connected to RESET0 signal. The output of IC26 is connected to the CD reset input of flip-flop IC19.

During TEST pulse, comparators IC27 and IC28 follow the signal level and compare it to reference values formed via voltage divider made of resistors R54–R56. The output of NAND circuit IC24 stay at 0 V level for a time determined by the time constant of the circuit made of resistor R52 and capacitor C13. When the output of NAND gate IC24 goes to the +V level, the signal at input D of flip-flop IC29, connected to the +V voltage via resistor R57, is transferred to the output, which is connected to AND circuit IC30. If the line impedance is too low, the voltage at the—input of comparator IC28 will be lower than the reference voltage at the +-input, and the output of comparator IC28 becomes +V. The output Q of flip-flop IC29 goes to +V. The current flowing through resistor R58 and indicator LD7 causes the light emission of the indicator. Simultaneously, the other output of flip-flop IC29, Q falls to 0 V and the AND logic unit 14 disables the control of the power switch.

If during the line impedance test the voltage at the—input of comparator IC28 exceeds the voltage at its +-input, the comparator output will remain at 0 V, no current flows through indicator LD7, which thus remains unlit. Similarly, the other output of flip-flop IC29 remains at the +V voltage level.

The comparator IC27 checks whether the bus impedance is too high by measuring the voltage level of the pulse. If the +-input of comparator IC27 exceeds the reference voltage value at the—input, the comparator output will increase to the +V voltage, via resistor R59. After a time determined by the circuit consisting of resistor R60 connected in parallel with diode D20 and capacitor C14, the voltage across capacitor C14 at the input of Schmitt trigger IC31 will fall under the level of its threshold voltage. The trigger output, connected to AND gate IC32, will go high. If the output of comparator IC27, which is connected the other input of AND gate IC32, assumes the high state for an instant, then flip-flop IC20 will be set because its SD input momentarily receives the +V voltage. Consequently, a current will flow through resistor R44 and indicator LD6, which is lit. Simultaneously, the other output Q of flip-flop IC20, connected to AND gate IC30, falls to 0 V. As a result, the control voltage to the power switch is cut off (TOK signal becomes 0 V). TOK signal is obtained at the output of AND gate IC33, whose inputs are connected to the TEST signal and the output of AND gate IC30.

If the flip-flops IC20 and IC29 are set during the test, this means that the bus impedance is either too high or too low, and the indicator light corresponding to the detected fault remains lit. After the fault has been eliminated, the power should be switched off again in order to extinguish the indicator lights and to enable the control of the power switch 17.

Figure 11:
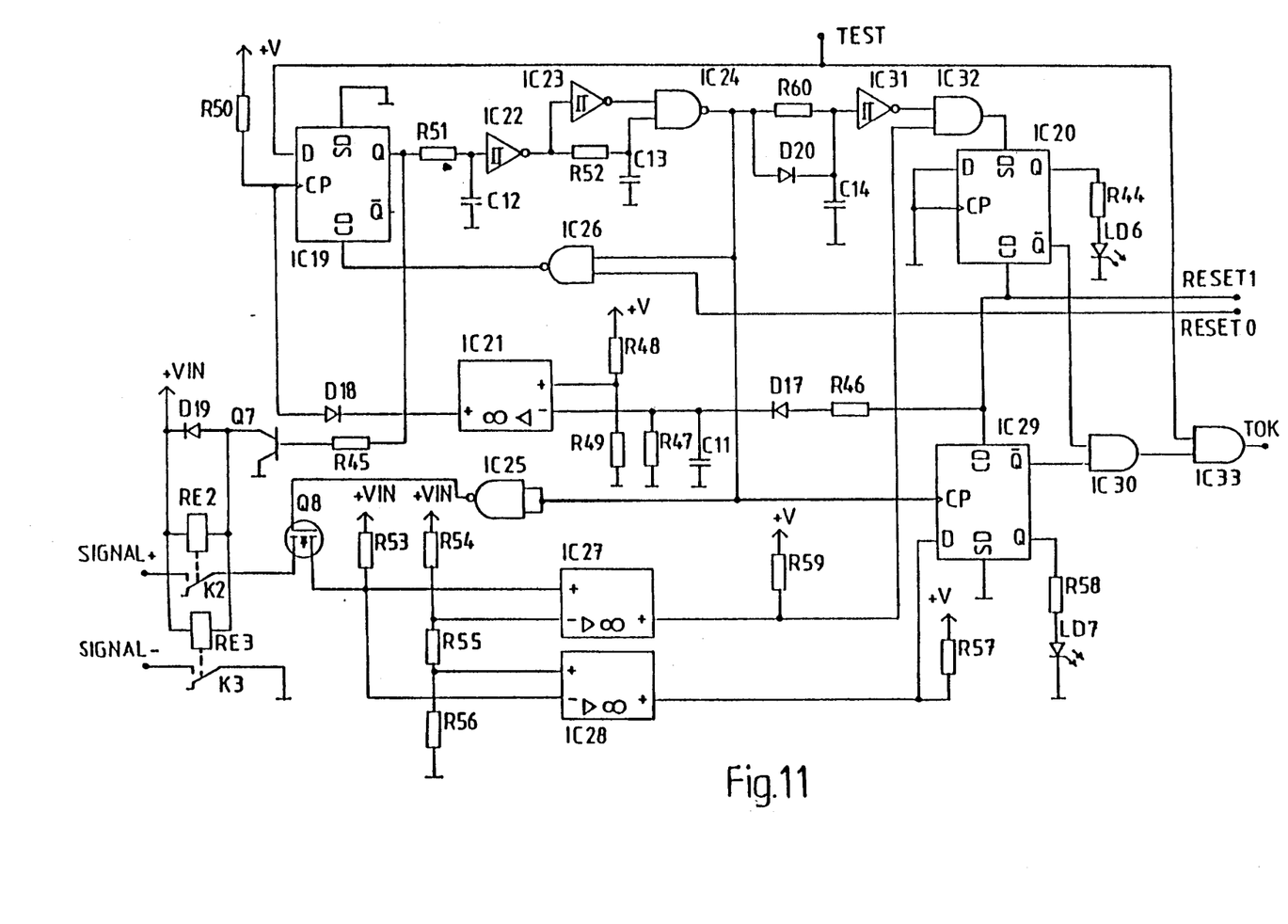
FIG. 11 represents the logic used for testing the line impedance.
Figures 12A, 12B:
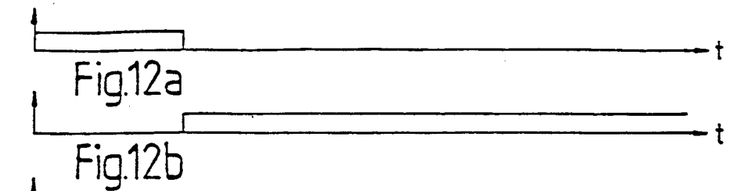
Figures 12C, 12D, 12E:
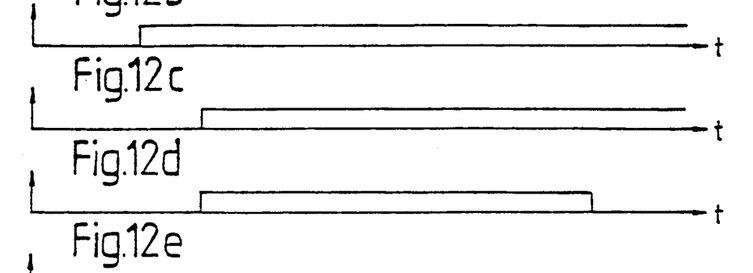
Figures 12F, 12G, 12H:
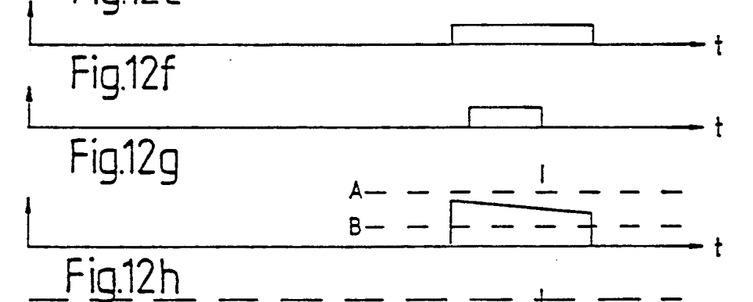
Figures 12I, 12J:
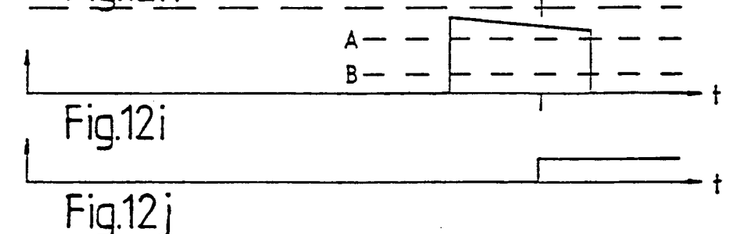
Figures 12K, 12L:
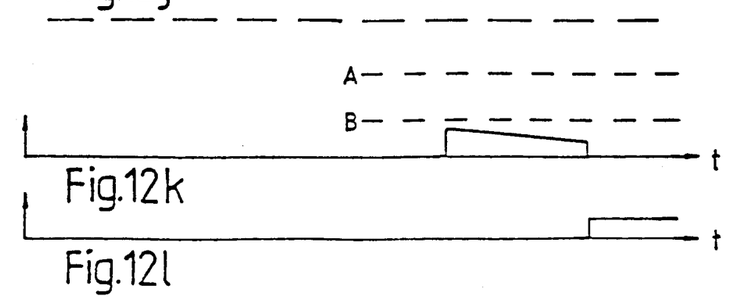

FIGS. 12a–12l represent the pulse diagrams for the line impedance testing logic shown in FIG. 11. The horizontal axis represents the time t. FIG. 12a represents the RESET1 signal and FIG. 12b, the RESET0 signal. FIG. 12c represents the TEST signal. FIG. 12d represents the CP input of flip-flop IC19. FIG. 12e represents the signal controlling relays RE2 and RE3. FIG. 12f represents the test pulse at the output of NAND gate IC25. FIG. 12g represents the output of Schmitt trigger IC31. FIG. 12h represents the test pulse when the line impedance values are correct. The broken lines in FIGS. 12h, 12i and 12k represent the upper and lower reference values. FIG. 12i represents the test pulse and FIG. 12j the Q output of flip-flop IC20 when the line impedance is too low. FIG. 12k represents the test pulse and FIG. 12l the Q output of flip-flop IC29 when the line impedance is too high.

It is obvious to a person skilled in the art that different embodiments of the invention are not restricted to the example described above, but that they may instead be varied within the scope of the following claims.

The embodiments of the invention in which an exclusive property or privilege is claimed are defined as follows:

1. A method for electronic protection of a data transmission network, said network being located in the proximity of A.C. power supply lines, said method comprising the steps of:
(a) continuously measuring a bus voltage of a signal bus connected to at least one signal device and having terminal impedances connected to the ends of said signal bus, wherein said signal bus is connected to a DC supply voltage and ground voltage via a first impedance and a second impedance, respectively, for detecting the presence of undesirable AC, DC and ground voltages;
(b) measuring a bus impedance of said signal bus using a test pulse each time voltage is connected to said signal bus; and
(c) disconnecting at least said DC supply voltage from said at least one signal device if either the bus voltage or said bus impedance or both are outside an acceptable range.

2. A method for electronic protection of an elevator system data transmission network having a signal bus with terminal impedances and connected to at least one signal device, wherein said signal bus is connected to a DC supply voltage and ground voltage via a first and a second impedance, respectively, said network being located in the proximity of A.C. power supply lines, said method comprising the steps of:
(a) monitoring said signal bus to continuously measure a bus voltage for detecting the presence of undesirable AC, DC, and ground voltages;
(b) measuring a bus impedance of said signal bus by means of a test pulse; and
(c) disconnecting at least said DC supply voltage from said at least one signal device if either the bus voltage or said bus impedance or both are outside an acceptable range; and
(d) deactivating a mains voltage present on said power supply lines supplying an elevator system if a mains voltage phase is detected on said bus.

3. An apparatus for the electronic protection of a data transmission network, said network having a signal bus with terminal impedances connected to the ends of said signal bus and at least one signal device, said network being located in the proximity of AC power supply lines, said apparatus comprising:
a first impedance and a second impedance connecting the signal bus to a DC supply voltage and ground voltage, respectively;
a main voltage monitoring unit and DC supply and ground voltage monitoring unit for monitoring a bus voltage for detecting the presence of undesirable AC, DC and ground voltages;
a line impedance testing logic unit for measuring a bus impedance of said bus by means of a test pulse; and a power switch controlled by a power switch control logic unit which disconnects the DC supply of said at least one signal device if either the measured voltage or said bus impedance or both are outside an acceptable range.

4. An apparatus as claimed in claim 3, further comprising:
a mains control unit which deactivates the mains voltage in the case of an erroneous presence of a mains voltage phase on said signal bus.

5. An apparatus as claimed in claim 3, wherein said first and second impedances connecting the signal bus to the DC supply voltage and ground voltage, respectively are resistors with equal value of electrical resistance.

6. An apparatus as claimed in claim 3 or 4 further comprising:
a logic unit for processing status information from said mains voltage monitoring unit and said DC supply and ground voltage monitoring unit and accordingly controlling said line impedance testing logic unit to start or stop the measurement of the bus impedance if said measured voltage is within allowed limits.

7. An apparatus as claimed in claim 3 or 4 further comprising a reset unit for resetting the logic circuits after the power supply of said apparatus has been switched on.

8. An apparatus as claimed in claim 3 or 4 further comprising an overvoltage protector unit which disconnects said at least one signal device when the supply voltage exceeds an admissible value.

9. An apparatus as claimed in claim 3 or claim 4 wherein the voltage across a sensing resistor controls the operation of the said power switch control logic unit in such a way that when this voltage is smaller than a preset limit, said power switch is turned on, and when this voltage exceeds the preset limit at least during a preset time interval, said power switch is turned off.

10. An apparatus as claimed in claim 9, wherein said power switch control logic unit comprises a dynamic current limitation circuit for turning off said power switch when current across said sensing resistor increases faster than a preset limit.

11. An apparatus as claimed in claim 3 or 4 wherein indicators visually acknowledge an erroneous situation.

12. An apparatus as claimed in claim 3 wherein said mains voltage monitoring unit and DC supply and ground voltage unit include a delay circuit and a comparator for comparing a reference voltage to the bus voltage detected on the bus so that in the case of an erroneous connection of the supply voltage or mains voltage to the bus, the bus voltage is applied to said comparators, connected after said delay circuits.

* * * * *